United States Patent [19]
Drake et al.

[11] 3,847,625
[45] Nov. 12, 1974

[54] LEAD FREE GLASS COMPOSITION

[75] Inventors: Cyril Francis Drake, Harlow; Robert Walter James Amos, New Barnet, both of England

[73] Assignee: International Standard Electric Corporation, New York, N.Y.

[22] Filed: Aug. 14, 1972

[21] Appl. No.: 280,398

[52] U.S. Cl.................... 106/52, 252/518, 252/521
[51] Int. Cl............................................. C03c 3/00
[58] Field of Search ............... 106/52; 252/518, 521

[56] References Cited
UNITED STATES PATENTS

| | | | |
|---|---|---|---|
| 3,093,598 | 6/1963 | McMillan...................... | 252/518 X |
| 3,342,753 | 9/1967 | Trap................................. | 252/518 |

*Primary Examiner*—Winston A. Douglas
*Assistant Examiner*—John F. Niebling
*Attorney, Agent, or Firm*—John T. O'Halloran; Menotti J. Lombardi, Jr.; Richard A. Menelly

[57] ABSTRACT

A lead free manganese containing range of glass compositions which have their surface layer rendered electrically conductive by an oxidizing process which does not produce water vapor.

3 Claims, No Drawings

LEAD FREE GLASS COMPOSITION

BACKGROUND OF THE INVENTION

This invention relates to glass compositions and more particularly, but not exclusively, to such glasses which find application in the manufacture of channel plates.

The walls of the channels of a channel plate are required to be electrically conductive but this conductivity is advantageously confined to a surface layer. In the past channel plates have conventionally been made of lead containing glasses which in bulk are electrically insulating but which can be provided with an electrically conductive surface layer by heating the material in hydrogen so as to reduce a proportion of any oxide of lead near the surface of the material to metallic lead. Such glasses are however not entirely satisfactory partly because the reduction process produces water vapor which may be released over a period of time to spoil the vacuum of the envelope in which the channel plate is housed, and partly because the presence of lead is liable to poison the cathode whose electron emission is to be multiplied by the channel plate. Furthermore the reduction process is difficult to control in such a way as to provide reproducible values of surface conductivity.

SUMMARY OF THE INVENTION

Therefore, the main object of this invention is to provide a new range of lead-free manganese containing glass compositions which in bulk are electrically insulating but which can be provided with an electrically conductive surface layer by oxidation.

According to the present invention there is provided a glass composition comprising:

40 — 67 mole percent $SiO_2$
12 — 27 mole percent MnO
5 — 20 mole percent $Na_2O + K_2O$
5 — 20 mole percent CaO + MgO
and
0 — 3 mole percent $A_2O_3$, the composition containing not more than 40 mole percent in aggegate of oxides of manganese, calcium, and magnesium.

DESCRIPTION OF THE PREFERRED EMBODIMENT

The subject glass compositions may be melted, fired and formed by conventional methods known in the art. It has been found that they do not readily devitrify, and that they can be worked by conventional glass working methods. In order to produce an electrically conductive surface layer in a piece of such glass it can be heated in air or oxygen to a temperature in the range of 500°–700°C for a period of several hours. By this method surface conductivities in the range of $10^6 - 10^{14}$ ohms per square have been produced.

It has been discovered that the subject glass composition may comprise 40 to 67 mole percent silicon dioxide, 12–27 mole percent manganese oxide, 5–20 mole percent sodium oxide and potassium oxide, 5–20 mole percent calcium oxide and magnesium oxide, and 0–3 mole percent aluminum oxide, the composition containing not more than 40 mole percent in aggregates of the oxides of manganese, calcium and magnesium. However, a preferred composition within this range comprises 57–62 mole percent silicon dioxide, 12–18 mole percent manganese oxide, 15–17 mole percent sodium oxide and potassium oxide, 8–10 mole percent calcium oxide and magnesium oxide, and 0–1 mole percent of aluminum oxide.

It has been found easier to produce reproducible values of surface conductivity by this method of oxidation of these glasses than are obtainable by the reduction of the surface layers of lead containing glasses. It is thought that the conductivity produced by oxidation can be attributed to the interaction of manganese ions in different valence states arising from the partial conversion in the region of the surface of manganous ions ($Mn^{++}$) to manganic ions ($Mn^{+++}$). If this is so, then the reaction is a homogeneous reaction and therefore liable to be more easily controllable than the two phase reduction process in which discrete regions of metallic lead are formed which then have to be allowed to coalesce in order to provide the necessary conductive path.

It may be noted that the oxidation process does not result in the formation of water vapor.

While the principles of the invention have been described in connection with specific structure, it is to be clearly understood that this description is made only by way of example and not as a limitation to the scope of the invention, as set forth in the objects thereof and in the accompanying claims.

We claim:

1. A lead-free glass composition of the type containing silicon, manganese, and a quantity of alkali metal and wherein the surface is rendered electrically conductive by oxidation, the composition comprising in combination:

40 — 67 mole percent $SiO_2$;
   12 — 27 mole percent MnO;
   5 — 20 mole percent $Na_2O + K_2O$;
   5 — 20 mole percent CaO + MgO; and
   0 — 3 mole percent $Al_2O_3$,
   the composition containing not more than 40 mole percent in aggregate of oxides of manganese, calcium, and magnesium.

2. A lead-free glass composition of the type containing silicon, manganese, and a quantity of alkali metal and wherein the surface is rendered electrically conductive by oxidation, the composition comprising in combination:

57 — 62 mole percent $SiO_2$;
   12 — 18 mole percent MnO;
   15 — 17 mole percent $Na_2O + K_2O$;
   8 — 10 mole percent CaO + MgO; and
   0 — 1 mole percent $Al_2O_3$.

3. A composition, according to claim 1, having a surface conductivity in the range $10^6$ to $10^{14}$ ohms per square.

* * * * *